United States Patent [19]
Beck et al.

[11] Patent Number: 5,798,147
[45] Date of Patent: Aug. 25, 1998

[54] PROCESS FOR COATING AND PRINTING SUBSTRATES

[75] Inventors: Erich Beck, Ladenburg; Frank Meyer, Ludwigshafen; Ulrich Poth, Münster; Karl Siemensmeyer, Frankenthal; Claudia Sierakowski, Giessen; Norbert Greif, Bobenheim; Werner Ostertag, Grünstadt; Michael Zirnstein, Schriesheim; Reinhold Leyrer, Ludwigshafen; Ekkehard Jahns, Weinheim; Karl-Heinz Etzbach, Frankenthal; Peter Schuhmacher, Mannheim, all of Germany

[73] Assignee: BASF Aktiengesellschaft, Ludwigshafen, Germany

[21] Appl. No.: 836,874

[22] PCT Filed: Nov. 21, 1995

[86] PCT No.: PCT/EP95/04576
   § 371 Date: May 23, 1997
   § 102(e) Date: May 23, 1997

[87] PCT Pub. No.: WO96/02597
   PCT Pub. Date: Feb. 1, 1996

[30] Foreign Application Priority Data

Nov. 23, 1994 [DE] Germany .................. 44 41 651.2
Sep. 1, 1995 [DE] Germany ................. 195 32 419.6

[51] Int. Cl.$^6$ .............. C09K 19/54; B05D 3/02; B05D 3/06
[52] U.S. Cl. .............. 427/511; 427/385.5; 252/299.5
[58] Field of Search .............. 428/1; 252/299.05, 252/299.5; 427/385.5, 511

[56] References Cited

U.S. PATENT DOCUMENTS

| | | | |
|---|---|---|---|
| 4,614,619 | 9/1986 | Shannon | 260/397.2 |
| 4,637,896 | 1/1987 | Shannon | 252/299.7 |
| 4,780,383 | 10/1988 | Garrett et al. | 430/11 |
| 5,362,315 | 11/1994 | Müller-Rees et al. | 106/493 |

FOREIGN PATENT DOCUMENTS

| | | |
|---|---|---|
| 0 358 208 | 9/1988 | European Pat. Off. . |
| 0 623 630 | 4/1994 | European Pat. Off. . |
| 2 537 976 | 12/1982 | France . |
| 35 35 547 | 10/1985 | Germany . |
| 36 04757 | 2/1986 | Germany . |
| 42 40 743 | 12/1992 | Germany . |
| 43 42 280 | 12/1993 | Germany . |
| 44 05 316 | 2/1994 | Germany . |
| 44 08 170 | 3/1994 | Germany . |
| 44 08 171 | 3/1994 | Germany . |
| 44 18 075 | 5/1994 | Germany . |
| 2 132 623 | 12/1983 | United Kingdom . |
| 2132623 | 7/1984 | United Kingdom . |
| 2 276 883 | 4/1993 | United Kingdom . |
| 2276883 | 10/1994 | United Kingdom . |

OTHER PUBLICATIONS

Liquid Crystals, Heinz Baessler, Festkoerperprobleme XI (1971), pp. 99–133.

Densely Crosslinked Cholesteric Polymer Networks, D.J. Broer, I. Heynderickx, J. Lub, Philips Research Abstr. II, 921 (1992).

Preparation of Ordered, Crosslinked and Thermally Stable Liquid Crystalline Poly (Vinyl Ether) Films H. Anderson, et al, Polymer, 1992, vol. 33, No. 19, pp. 4014–4019.

Anisotropic Networks Obtained by In Situ Cationic Polymerization of Liquid–Crystalline Divinyl Ethers, R.A. M. Hikmet et al, Polymer, 1993, vol. 1993, vol. 34, No. 8, pp. 1736–1740.

Translation of DE 4418075, Nov. 1995.
Translation of FR 2537976, Jun. 1984.
Translation of DE 4342280, Jun. 1995.

*Primary Examiner*—Erma Cameron
*Attorney, Agent, or Firm*—Oblon, Spivak, McClelland, Maier & Neustadt, P.C.

[57] ABSTRACT

A process for coating or printing substrates with a coating or printing composition comprises applying a polymerizable material containing liquid-crystalline, polymerizable monomers which carry at least two polymerizable groups for coating and at least one polymerizable group for printing, to the substrate, and subsequently carrying out the polymerization, where the coating composition or the printing composition comprises a$_1$) a chiral liquid-crystalline monomer and b) a polymeric binder and/or monomeric compounds which can be converted into the polymeric binder by polymerization, or, in the case of emulsion coatings and printing inks, a dispersion auxiliary d), or the coating composition or the printing composition comprises a$_2$) an achiral liquid-crystalline monomer, b) a polymeric binder and/or monomeric compounds which can be converted into the polymeric binder by polymerization, or, in the case of emulsion coatings and printing inks, a dispersion auxiliary d), and c) a non-liquid-crystalline chiral compound.

15 Claims, No Drawings

20

PROCESS FOR COATING AND PRINTING SUBSTRATES

BACKGROUND OF THE INVENTION

1. Field of the Invention

The invention relates to a process for coating or printing substrates with a coating or printing composition, which comprises applying a polymerizable material containing liquid-crystalline, polymerizable monomers which carry at least two polymerizable groups for coating and at least one polymerizable group for printing, to the substrate, and subsequently carrying out the polymerization, where the coating composition or the printing composition comprises a₁) a chiral liquid-crystalline monomer and b) a polymeric binder and/or monomeric compounds which can be converted into the polymeric binder by polymerization, or, in the case of emulsion coatings and printing inks, a dispersion auxiliary d), or the coating composition or the printing composition comprises a₂) an achiral liquid-crystalline monomer, b) a polymeric binder and/or monomeric compounds which can be converted into the polymeric binder by polymerization, or, in the case of emulsion coatings and printing inks, a dispersion auxiliary d), and c) a non-liquid-crystalline chiral compound.

The present invention furthermore relates to mixtures containing these polymerizable, liquid-crystalline compounds which are suitable as reaction-drying surface coatings, emulsion paints or printing pastes, to the use of these compounds in surface-coating systems, printing inks and writing inks, and to a process for the preparation of pigments from these compounds.

2. Description of the Background

Surface-coated materials whose color impression depends on the observation angle open up interesting potential applications.

DE-A 35 35 547 describes a process in which a mixture of cholesterol-containing monoacrylates can be converted into cholesteric layers by photocrosslinking. However, a material of this type, as a linear polymer with the mesogenic moieties in the side chain, is not very mechanically stable.

DE-A 42 40 743 describes pigments whose color is dependent on the observation angle and which comprise aligned, three-dimensionally crosslinked substances having a liquid-crystalline structure with a chiral phase and, if desired, further dyes and pigments. These pigments are suitable for coloring paints, plastics, fiber raw materials, cosmetics or printing inks of all types, for example screen printing inks.

However, the preparation of these pigments requires that three-dimensionally crosslinkable liquid-crystalline substances having a chiral phase are applied to a substrate, crosslinked on this substrate to give a brittle layer, and detached from the substrate after crosslinking. The pigments, obtained by grinding, are then incorporated into surface-coating systems or printing inks.

When used for coating substrates, these materials frequently prove disadvantageous owing to the uneven surface.

Further disadvantages are the process temperatures, which are significantly above room temperature, and the multistep procedure with application to an intermediate substrate, comminution to give pigments, preparation of semifinished products, known as pigment pastes, and incorporation into the color mixture.

SUMMARY OF THE INVENTION

It is an object of the present invention to overcome these disadvantages of the prior art.

We have found that this object is achieved by the process described at the outset for coating substrates.

DETAILED DESCRIPTION OF THE INVENTION

The novel coatings can be brittle or non-brittle after curing. For the purposes of the present invention, non-brittle is taken to mean, in contrast to DE-A 42 40 743, that the cured coatings cannot be detached from the substrate by mechanical means, for example by passing the coated substrate over a deflection roll of small diameter, without damage. Non-brittle coatings are particularly advantageous as paint-like coatings.

The color impression of the novel coatings is based on the formation of cholesteric liquid-crystalline phases.

In a cholesteric phase, the liquid crystals form a helical superstructure which is perpendicular to the long axes of the molecules (H. Baessler, Festkörperprobleme XI, 1971).

The cholesteric phase has remarkable optical properties: high optical rotation and pronounced circular dichroism caused by selective reflection of circular-polarized light within the cholesteric layer. The colors, which appear different depending on the viewing angle, depend on the pitch of the helical superstructure, which in turn depends on the twisting power of the chiral component. The pitch can be varied, in particular, by changing the concentration of a chiral dope and thus the wavelength range of selectively reflected light on a cholesteric layer.

Particularly stable coatings are obtained if the liquid-crystalline monomers a₁) and/or a2) contain two reactive groups which are susceptible to polymerization. The chiral component c) also preferably contains at least one reactive group of this type, so that diffusion of the compounds and consequently a change in the color impression of the layers is suppressed.

For the purposes of the present invention, polymerization is taken to mean all types of reaction in which polymers are built up, ie. addition polymerizations as chain reactions, addition polymerizations as stepwise reactions and, although less preferred for paint coatings, condensation polymerizations.

The novel process can be carried out using a liquid-crystalline compound, but also using a mixture of more than one of these liquid-crystalline compounds. In principle, all cholesteric liquid crystals are suitable. Furthermore, the cholesteric phase can be generated by doping a nematic liquid-crystal system with chiral dopes. Preference is given to a mixture of a plurality of nematic liquid-crystal components with a chiral dope, each of these components containing at least two polymerizable groups for coating and at least one, preferably two, polymerizable groups for printing.

Polymerizable liquid-crystalline compounds which are particularly suitable in accordance with the invention are therefore those described in the earlier German Patent Applications P 44 08 170.7 and P 44 08 171.5, or mixtures thereof.

These compounds are polymerizable, nematic liquid-crystalline materials which, alone or in mixtures with other polymerizable nematic liquid crystals, have broad nematic phase ranges and clearing points of below 140° C. and can be processed at below 140° C.

These compounds preferably conform to the formula I $$Z^1-(Y^1-A^1)_v-Y^2-M-Y^3-(A^2-Y^4)_w-Z^2 \qquad I$$

particularly preferably to the formula Ia

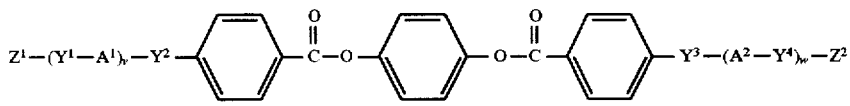

where each ring can carry up to three identical or different substituents from the following series: $C_1$- to $C_{20}$-alkyl, $C_1$- to $C_{20}$-alkoxy, $C_1$- to $C_{20}$-alkoxycarbonyl, $C_1$- to $C_{20}$-monoalkylaminocarbonyl, formyl, $C_1$- to $C_{20}$-alkylcarbonyl, fluorine, chlorine, bromine, cyano, $C_1$- to $C_{20}$-alkylcarbonyloxy, $C_1$- to $C_{20}$-alkylcarbonylamino, hydroxyl or nitro.

Of said radicals, chlorine, bromine, cyano, fluorine, hydroxyl, methyl, ethyl, methoxy, ethoxy, methoxycarbonyl, formyl, acetyl and acetoxy, and long-chain radicals having at least 8 carbon atoms are preferred.

In the formulae I and Ia, the radicals have the following meanings:

$Z^1$ and $Z^2$ are reactive groups via which polymerization can be effected, or radicals containing a reactive group of this type, $Y^1$, $Y^2$, $Y^3$ and $Y^4$ are a direct bond, —O—, —S—, —CO—O—, —O—CO—, —O—CO—OH—, —$NR^1$—CO—O—, —O—CO—$NR^1$— or —$NR^1$—CO—$NR^1$—, $R^1$ is $C_1$-$C_4$-alkyl or hydrogen, $A^1$ and $A^2$ are spacers, and v and w are 0 or 1, M is a mesogenic group which preferably has the structure of the formula II:

$$(T-Y^5)_m-T \qquad II$$

where the radicals

T are identical or different, divalent isocycloaliphatic, heterocycloaliphatic, isoaromatic or heteroaromatic radicals, $Y^5$ are identical or different —CO—O—, —O—CO—, —$CH_2$O—, —O$CH_2$—, —COS—, —S—CO—, —$CH_2$—S—, —S—$CH_2$—, —CH=N— or —N=CH— bridges or a direct bond, and m is 1, 2, 3 or 4.

Preferred groups $Z^1$ and $Z^2$ are those which can be polymerized by a photochemical initiation step, including, in particular, the vinyl group and the isopropenyl group, and in addition the 4-vinylphenyl group and the 1-chloroethenyl group.

Further preferred polymerizable groups $Z^1$ and $Z^2$ are those containing an epoxide, cyanate or isocyanate radical.

Compounds containing the cyanate radical are particularly preferred since they even react thermally to form cyanurates. If they contain two cyanate groups, wide-mesh networks are obtained, as are particularly advantageous for the formation of stable liquid-crystalline layers.

Epoxides and isocyanates, for polymerization in the sense of polyaddition, require further compounds containing complementary reactive groups. For example, isocyanates can react with alcohols to form urethanes and with amines to form urea derivatives. An analogous situation applies to epoxides. The complementary reactive groups can be present in a second compound $a_1$) or $a_2$), which is mixed with the first compound, or they can be introduced into the polymerization mixture by auxiliary compounds containing two or more of these complementary groups.

$Y^1$, $Y^2$, $Y^3$ and $Y^4$ are particularly preferably ether, ester or carbonate (—CO—O—) groups, in addition to a direct bond.

Suitable spacers $A^1$ and $A^2$ are all groups known for this purpose. The spacers are usually linked to $Z^1$ or $Z^2$ via ester, ether or carbonate groups or a direct bond. Particularly suitable spacers are alkylene groups having 2 to 30, preferably 2 to 12, carbon atoms, which may be interrupted in the chain, for example by ether oxygen atoms or by non-adjacent imino or methylimino groups. Suitable substituents for the spacer chain are furthermore fluorine, chlorine, bromine, cyano, methyl or ethyl. Examples of representative spacers are

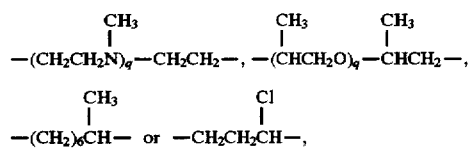

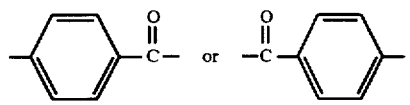

where q is from 1 to 3, and p is from 2 to 12.

The moieties containing the external aromatic rings of the mesogenic group

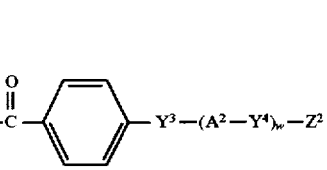

in the compounds of the formula Ia preferably have, independently of one another, one of the following structures:

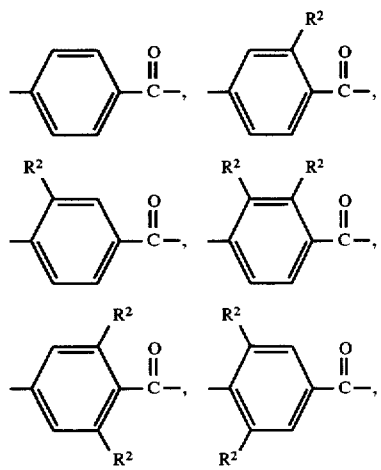

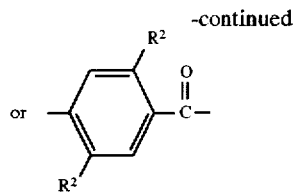

where $R^2$ is F, Cl, Br, $C_1$–$C_{20}$-alkyl, $C_1$–$C_{20}$-alkoxy, $C_1$–$C_{20}$-alkylcarbonyl, $C_1$–$C_{20}$-alkylcarbonyloxy, CHO or CN, and the substituents can also be mixed.

The moiety containing the central aromatic ring

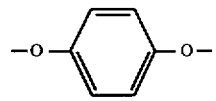

in the formula Ia preferably has the following substitution pattern:

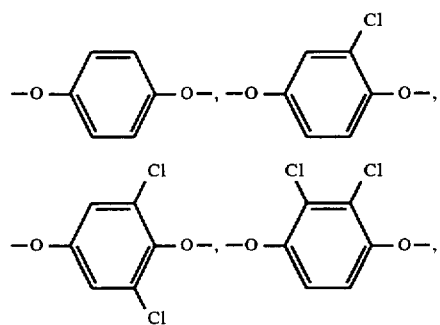
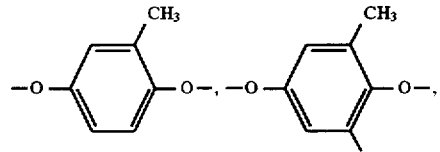
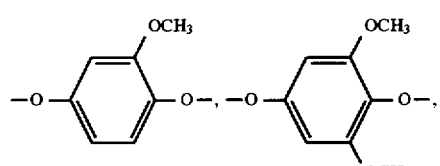
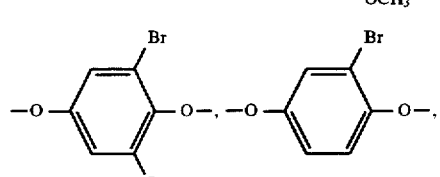
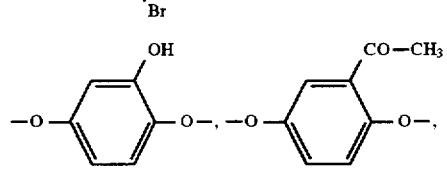

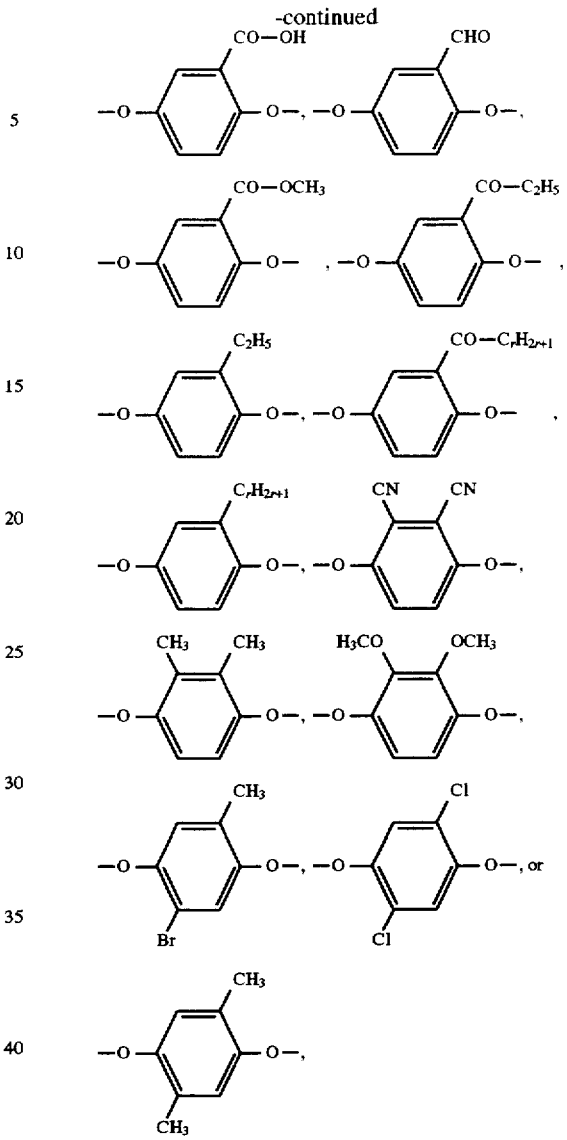

where r is from 2 to 20, preferably from 8 to 15.

Particularly suitable components $a_2$) for the novel coating and printing compositions are compounds of the formula I in which at least one of the radical pairs $Z^1$ and $Z^2$, $Y^1$ and $Y^4$, $Y^2$ and $Y^3$, and $A^1$ and $A^2$ comprises two different radicals. Asymmetrical compounds I and Ia of this type considerably broaden the liquid-crystalline state range of the coating compositons employed in accordance with the invention.

The novel compounds are prepared by methods known per se. In general, the moieties $Z^1$, $Z^2$, $A^1$, $A^2$ and M are linked to one another by condensation reactions in such a way that the bridges $Y^1$ to $Y^4$ are formed. Starting components here are selected so that the corresponding esters or amides are formed. Preference is given to reaction of acid chlorides with hydroxyl or amino compounds. This reaction principle also applies to the synthesis of the mesogenic group from the corresponding ring system components. The carbonate group is preferably formed by successive reaction of hydroxyl-carrying moieties with phosgene. Further details on the preparation of the compounds are given in German Patent Applications P 44 05 316.9, P 44 08 171.5 and P 44 08 170.7 which correspond to Published German Applications DE 44 05 316, DE 44 08 171 and DE 44 08 170 respectively.

The compounds of the formulae I and Ia, alone, in mixtures with one another or with other liquid-crystalline compounds, have liquid-crystalline phase structures and can be converted into highly crosslinked polymers by free-radical or ionic polymerization processes with retention of their liquid-crystalline order structure.

In order to establish desired properties of the mixtures, it may be expedient to use more than two compounds of the formula I or Ia or alternatively mixtures of novel compounds I or Ia with other polymerizable liquid crystals.

The radicals T can, if desired, be substituted by $C_1$- to $C_{20}$-alkyl, $C_1$- to $C_{20}$-alkoxy, $C_1$- to $C_{20}$-alkoxycarbonyl, $C_1$- to $C_{20}$-monoalkylaminocarbonyl, formyl, $C_1$- to $C_{20}$-alkylcarbonyl, fluorine, chlorine, bromine, cyano, $C_1$- to $C_{20}$-alkylcarbonyloxy, $C_1$- to $C_{20}$-alkylcarbonylamino, hydroxyl or nitro, preference being given, in the case of all substituents containing alkyl groups, to short-chain substituents having 1 to 6 carbon atoms and to long-chain substituents having 14 to 20 carbon atoms. Particularly preferred substituents are fluorine, chlorine, bromine, cyano, hydroxyl or nitro. The radicals T conform, for example, to the following basic structures:

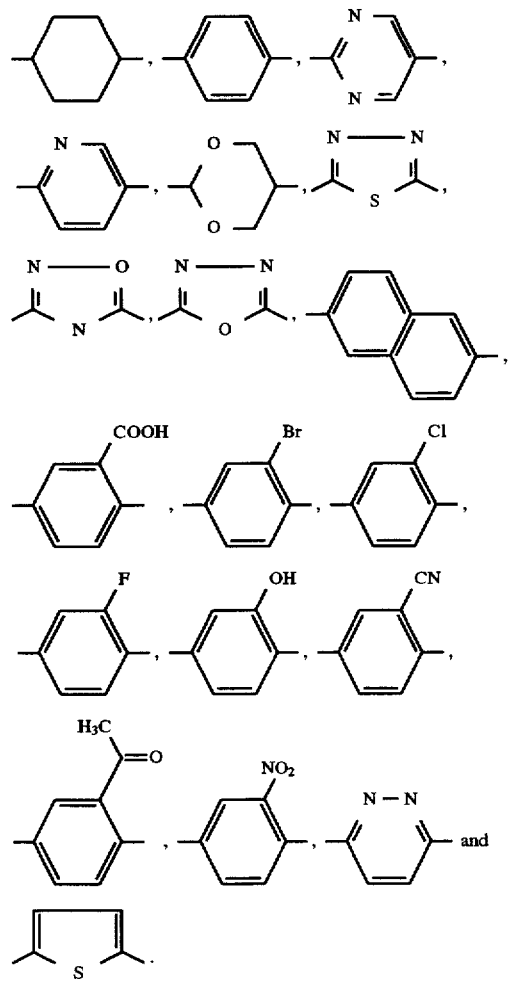

Particularly preferred mesogenic groups M are the following:

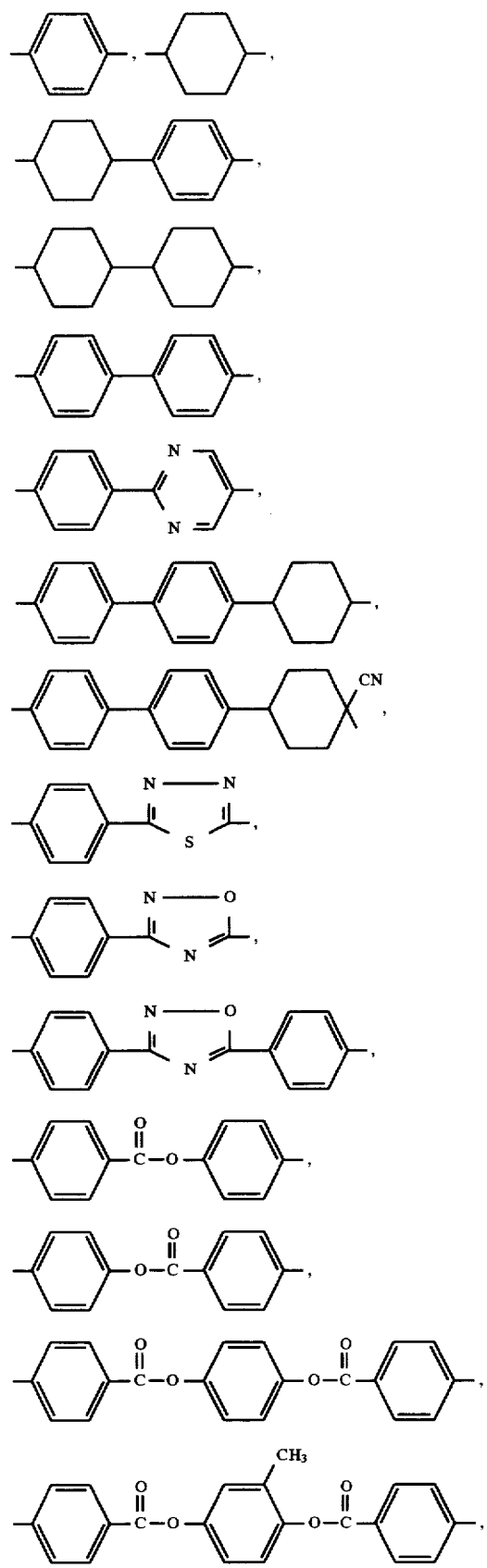

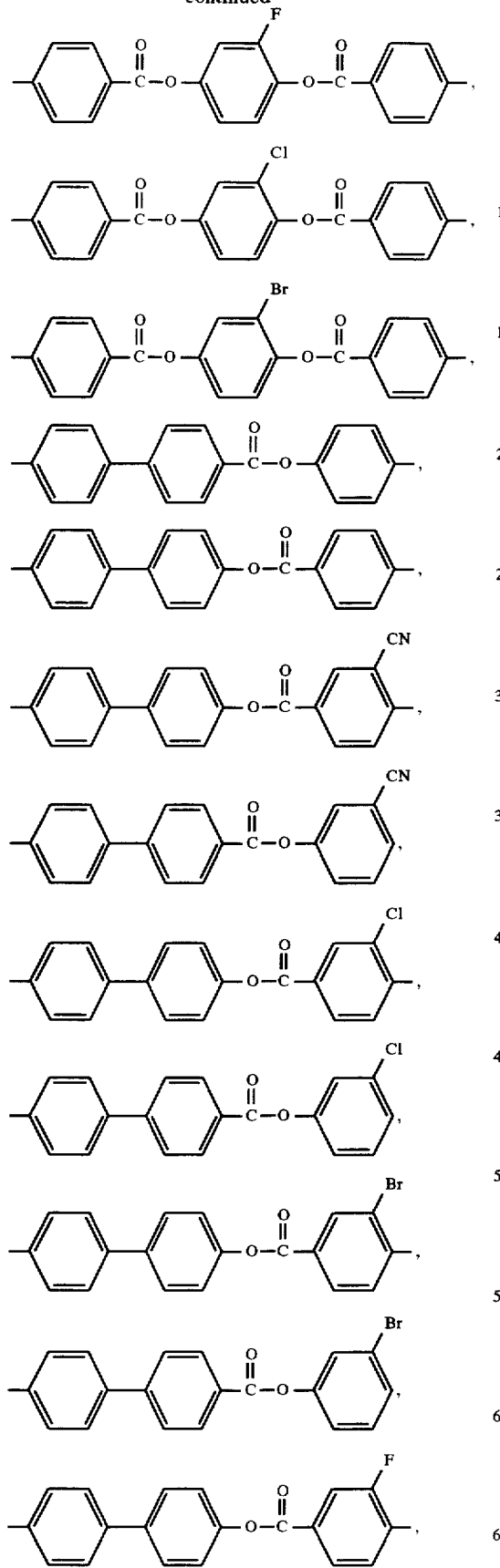
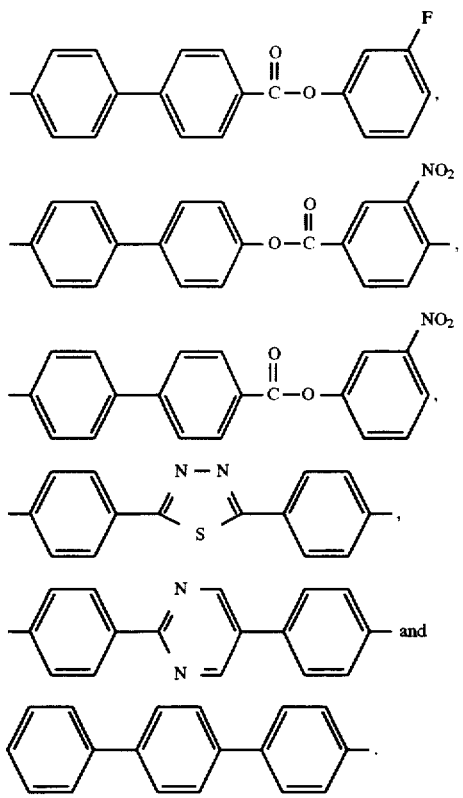

Further suitable polymerizable, liquid-crystalline compounds are described, for example, in DE-C 36 04 757, EP-A 0 358 208 and in D. J. Broer et al. in 14th Int. Liquid. Conf., Abstr. II, 921 (1992); H. Andersson, U. W. Gedde, A. Hult, Polymer, 1992, 33, 4014; R. A., U. Hickmet, S. Lub, J. A. Higgins, Polymer, 1993, pages 34 ff., 1836 ff.

A characteristic feature of the novel coating or printing is the occurrence of cholesteric liquid-crystalline structures which cause the color impression. If the liquid-crystalline basic component is not itself chiral, the formation of a cholesteric phase can be effected by a chiral component c).

In order to produce a stable, cholesteric liquid-crystalline surface coating in which the cholesteric phase is fixed by crosslinking, this chiral component preferably contains reactive groups via which it can be bonded to the other polymerizable coating composition constituents during the curing process. The chiral compounds c) preferably carry at least one polymerizable group, at least one spacer and at least one mesogenic group. Owing to similarity with the liquid-crystalline component $a_1$) or $a_2$), chiral compounds of this type are particularly suitable as dopes for the production of cholesteric liquid-crystal phases; compounds of this type have excellent solubility or miscibility behavior and usually have a high twisting power. Examples of chiral components of this type are described in German Patent Application P 43 42 280.2 which corresponds to Published German Application DE 43 42 280. The chiral compounds preferably conform to the formula $$(Z^1-Y^1-A^1-Y^2-M-Y^3-)_n X \qquad III,$$

where $Z^1$, $Y^1$, $Y^2$, $Y^3$, $A^1$ and M are as defined above:

n is from 2 to 6, preferably 2 or 3, and

X is a chiral radical.

$A^1$, M, $Y^1$, $Y^2$, $Y^3$ and $Z^1$ may be identical or different since they are present n times in III.

Particularly advantageous compounds of the formula III are those in which the mesogenic groups M are radicals of the formula IIa

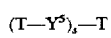  IIa where a is from 0 to 3, preferably 0 or 1, and $Y^5$ is as defined above.

Of the chiral radicals X in the compounds of the formula III, particular preference is given, inter alia owing to availability, to those derived from sugars, binaphthyl or biphenyl derivatives or from optically active glycols, dialcohols or amino acids. In the case of sugars, particular mention should be made of pentoses and hexoses, and derivatives thereof.

Examples of radicals X are the following structures, where the terminal dashes in each case indicate the free valences:

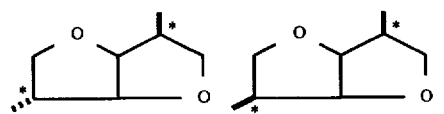

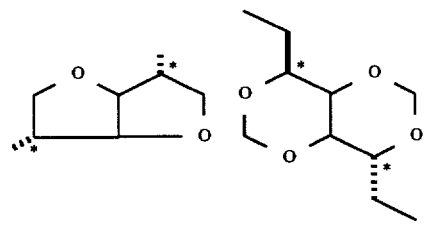

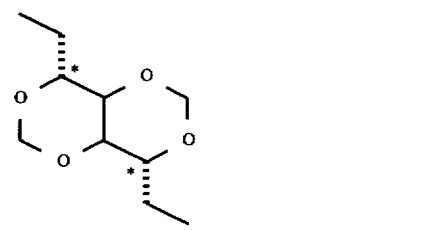

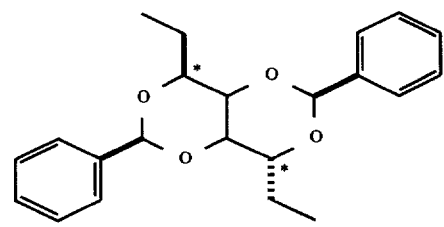

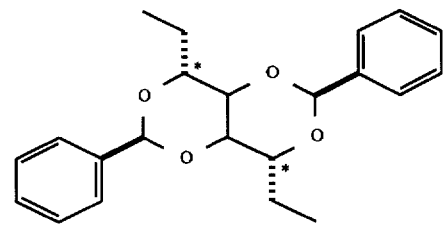

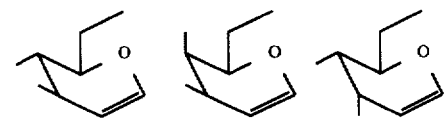

-continued

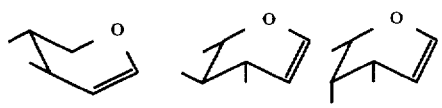

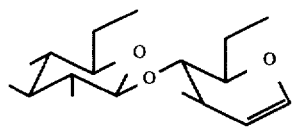

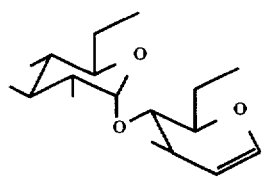

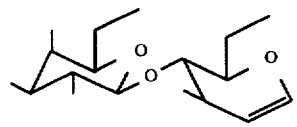

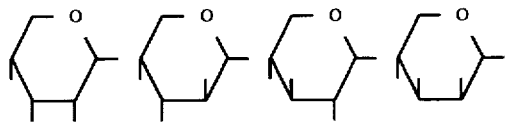

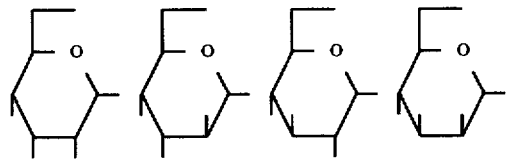

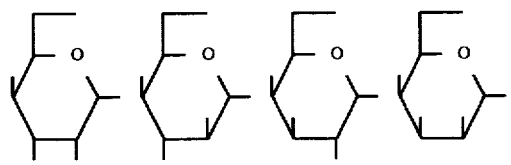

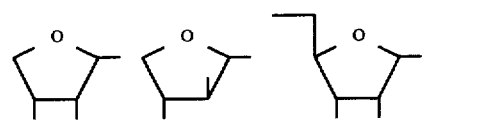

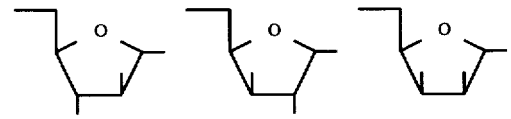

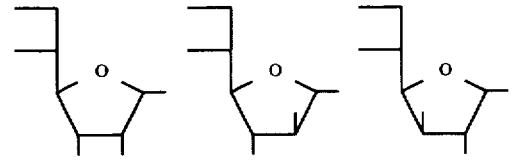

-continued

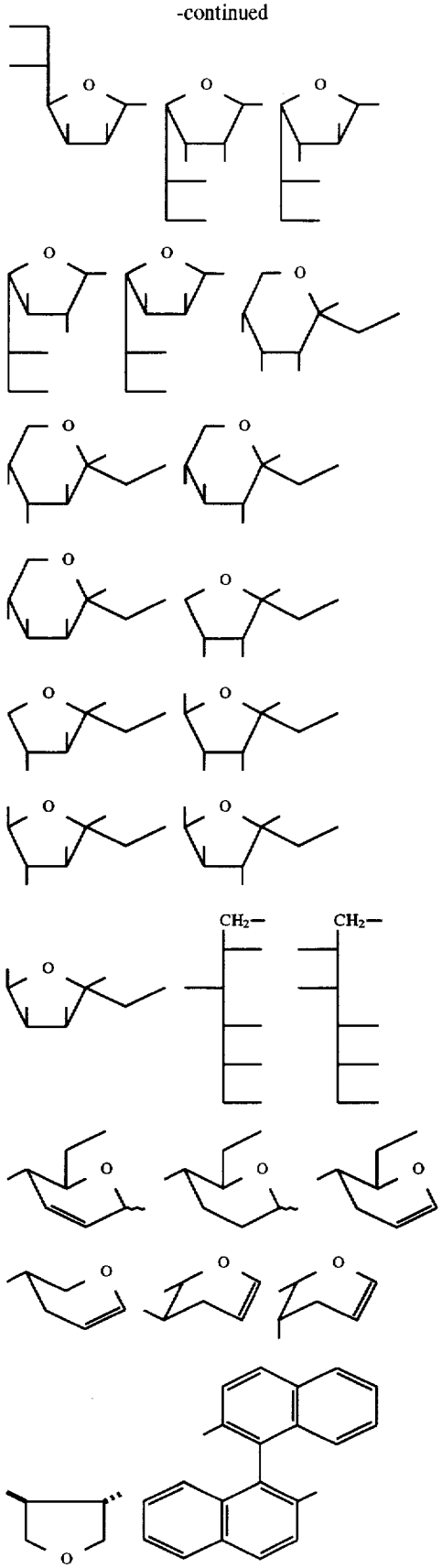

-continued

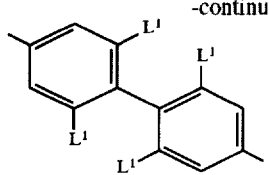

where
L$^1$ is C$_1$- to C$_4$-alkyl, C$_1$-C$_4$-alkoxy, halogen, COOR$^2$, OCOR$^2$, CONHR$^2$ or NHCOR$^2$, where R$^2$ is as defined for R$^1$.

Particular preference is given to

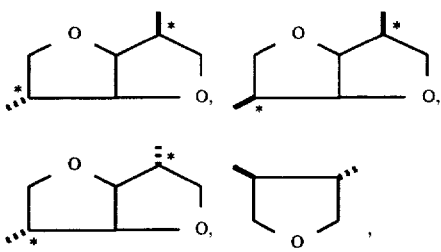

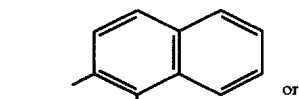

or

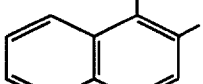

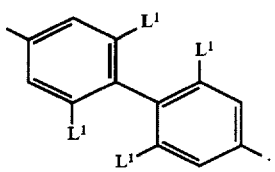

Also suitable are chiral groups which have the following structures:

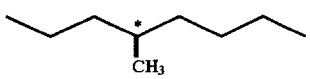

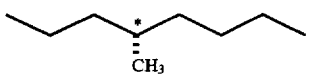

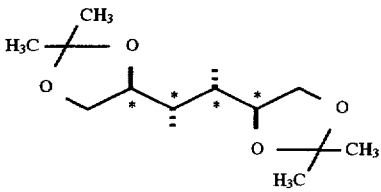

Further examples are mentioned in German Patent Application P 43 42 280.2 which corresponds to Published German Application DE 43 42 280.

Liquid crystals having twisted cholesteric phases only exhibit their particular optical properties if large areas of the phase have a uniform alignment. The known methods for achieving this alignment are, for example, interaction of the liquid-crystal phase with alignment layers, application of electric or magnetic fields or mechanical rubbing of the liquid-crystal layers. These alignment methods require special equipment which limits use to simple substrates, such as films or other uniform surfaces.

A particular advantage of the novel process is the possibility of applying the coating directly to the desired substrate and thus also to large surfaces with complex shapes. This possibility is achieved in accordance with the invention by mixing the liquid-crystalline compounds $a_1$) and $a_2$) and, if desired, the chiral compounds c) with a component b) which improves the miscibility of the components with one another and in particular the viscosity and the flow behavior of the coating or printing compositions. This component b) enables spontaneous alignment of the liquid-crystalline phases at low temperatures, without complex technical alignment methods, during the application process itself, ie., for example, during spraying, roll coating, dipping, application with the aid of a casting slot, or the various printing processes.

The variety of application methods and the range of requirements made on the finished coating mean that different compounds are preferred for surface-coating processes than for printing processes and for emulsion paints.

For sheet-like coatings, component b) is in particular a polymeric binder and/or a monomeric compound which can be converted into a polymeric binder by polymerization. Examples of suitable such compounds are polyesters, cellulose esters, polyurethanes, silicones and polyether- and polyester-modified silicones, in each case soluble in organic solvents. Particular preference is given to cellulose esters, such as cellulose acetobutyrate.

A reaction-drying surface-coating mixture particularly preferably contains polymeric binders which contain reactive, crosslinkable groups, such as acrylic, methacrylic, α-chloroacrylic, vinyl, vinyl ether, epoxide, cyanate, isocyanate or isothiocyanate groups. Monomeric compounds are also suitable as component b), in particular the reactive thinners known in paint production, for example hexanediol diacrylate or bisphenol A diacrylate. Even small amounts of such substances—usually as little as from 0.1 to 1% by weight—significantly improve the flow viscosity and thus enable the application of thin, homogeneous coatings in which the cholesteric liquid-crystal mixtures can align spontaneously. At the same time, these compounds have a great effect on the mechanical properties of the cured coating. Both the flow behavior and the elasticity of the coating can easily be adjusted as desired by varying the concentration and through the selection of the binders.

Mixtures which are suitable as reaction-drying surface coatings can contain a solvent or diluent as further component. Examples of suitable solvents or diluents are esters, in particular of acetic acid, alcohols, lactones, aliphatic and aromatic hydrocarbons, amides, N-alkylpyrrolidones, in particular N-methylpyrrolidone, and tetrahydrofuran and dioxane.

A particularly preferred reaction-drying surface coating mixture contains little or no solvent and contains water as diluent.

The addition of adhesion promoters to the novel coating material is advantageous for a stable surface coating. Examples of suitable adhesion promoters are silanes or compounds having the structure

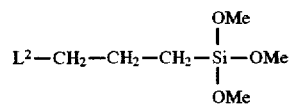

where $L^2$ is hydroxyl, an isocyanate group or a crosslinkable radical, for example an acrylate or epoxy group, or where $L^2$ carries a group of this type.

Furthermore, polymerization initiators which decompose either thermally or photochemically and thus effect curing of the surface coating can also be added to the coating material. Of the thermal polymerization initiators, preference is given to those which decompose at from 20° to 180° C., particularly preferably at from 50° to 80° C., and initiate the polymerization. In principle, all photoinitiators can be used for photochemical curing. In particular, mixtures of different initiators are also used in order to improve thorough curing. Examples of highly suitable photoinitiators are benzophenone and derivatives thereof, such as alkylbenzophenones, halomethylated benzophenones and 4,4'-bis (dimethylamino)benzophenone, and benzoin and benzoin ethers, such as ethylbenzoin ether, benzil ketals, such as benzil dimethyl ketal, acetophenone derivatives, such as hydroxy-2-methyl-1-phenylpropan-1-one and hydroxycyclohexyl phenyl ketone. Acylphosphine oxides, such as 2,4,6-trimethylbenzoyldiphenylphosphine oxide, are very particularly suitable. Preferred photochemically activatable polymerization initiators are those which have no yellowing effect.

Particularly preferred polymerization initiators are alkylboron compounds and peroxides, such as dibenzoyl peroxide and di-tert-butyl peroxide.

The photoinitiators, which are employed, depending on the application of the novel coatings, in amounts of from 0.01 to 15% by weight, based on the polymerizable components, can be used as individual substances or, owing to advantagoeus synergistic effects, also in combination with one another.

For cationic polymerizations, preferred initiators are those having charged structures, in particular those which are in some cases used in combination with acylphosphine oxides, for example:

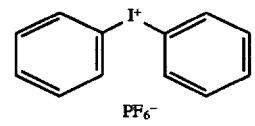

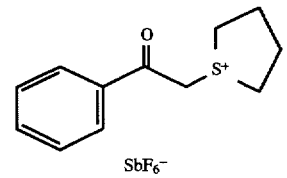

and derivatives of these compounds.

If desired, UV and weathering stabilizers can also be added to the novel surface coatings. Examples of suitable compounds for this purpose are derivatives of 2,4-dihydroxybenzophenone, derivatives of 2-cyano-3,3-diphenyl acrylate, derivatives of 2,2',4,4'-tetrahydroxybenzophenone, derivatives of ortho-hydroxyphenylbenzotriazole, salicylic esters, ortho-hydroxyphenyl-s-triazines or sterically hindered amines. These substances can be employed alone or preferably in the form of mixtures.

It is also possible to add pigments, dyes and fillers to the novel surface-coating systems.

Examples of inorganic pigments are iron oxides, titanium dioxide and the various types of carbon black.

Examples of organic pigments are those from the class consisting of monoazo pigments (for example products derived from acetoacetic arylide derivatives or from β-naphthol derivatives), monoazo dyes and metal salts thereof, such as β-oxynaphthoic acid dyes, disazo pigments, condensed disazo pigments, isoindoline derivatives, derivatives of naphthalene- or perylenetetracarboxylic acid, anthraquinone pigments, thioindigo derivatives, azomethine derivatives, quinacridones, dioxazines, pyrazoloquinazolones, phthalocyanine pigments or basic dyes, such as triarylmethane dyes, and salts thereof.

Further suitable pigments are effect pigments, such as aluminum particles, mica or coated mica or commercially available platelet-like effect pigments having various chemical structures.

Examples of suitable fillers are rutile, anatase, chalk, talc and barium sulfate.

Suitable additional dyes are all those which dissolve in the coating composition in a minimum concentration of 0.1 mol %. Dichroic dyes are very particularly suitable. The total proportion of pigments, dyes or fillers is generally up to 40% by weight, preferably from 0 to 10% by weight, based on the weight of the liquid-crystalline compounds.

The novel surface coatings have numerous advantages. For example, the substrates coated in accordance with the invention have high surface quality and an improved color impression compared with systems prepared from polymeric or oligomeric cholesteric liquid-crystal pigments.

For example, a motor vehicle painted in accordance with the invention appears to the observer in different colors at different viewing angles, while the high surface quality means high protection of the body to corrosion or mechanical damage and high gloss. This can be further improved by application of a clearcoat.

The helical structure of the polymer-fixed cholesteric liquid-crysalline phase means that part of the light hitting the surface is reflected at different wavelengths depending on the direction. The intensity of this color impression can be further increased by applying, one on top of the other, at least two novel coating films having the same selective reflection wavelength, but an opposite direction of rotation of the helix. This is achieved, for example, through the chiral component in the coating films in each case being compounds whose direction of rotation of the helix is opposite, but of similar size.

Further interesting color effects are achieved by layer-by-layer application of a plurality of coats with different selective reflection wavelengths in each layer.

In this way, an even greater number of observation angle-dependent hues can be produced.

Preference is furthermore given to coating processes in which the application and subsequent curing are carried out at from 10° to 130° C., particularly preferably at from 20° to 80° C.

Reaction-drying surface coatings as can be used, for example, for painting motor vehicles are preferably mixtures of from 5 to 99.8% by weight of component $a_1$) and from 0.2 to 20% by weight of component b), in each case based on the total amount of the reaction-drying surface-coating mixture, or mixtures of from 5 to 99.6% by weight of component $a_2$), from 0.2 to 20% by weight of component b) and from 0.2 to 20% by weight of component c), in each case based on the total amount of the reaction-drying surface-coating mixture.

Particular preference is given to mixtures of from 40 to 70% by weight of component $a_1$) and from 0.5 to 10% by weight of component b)

and of from 40 to 70% by weight of component $a_2$), from 0.5 to 10% by weight of component b) and from 0.5 to 5% by weight of component c).

In a further preferred embodiment of the novel process, the surface coating is carried out by means of a printing process.

All conventional printing processes (for example letterpress, rotogravure, flexographic, offset and screen printing) can be used here. Spontaneous alignment of liquid crystals caused by the application process itself likewise occurs here.

For the purposes of the present invention, the term printing process also includes those in which the coating composition is applied to a substrate, such as paper or plastic, for example by using a ball-point pen or fountain pen.

Since the reflection range can be adjusted from infra-red to ultra-violet light, the novel printing inks can also be used to produce marks and security inscriptions which are invisible to the human eye. They can be detected from the circular polarization or angle dependence.

Since printing processes make different demands on the mechanical properties of the coating and on the flow behavior necessary for processing, other compositions are preferred for these processes. Components $a_1$), $a_2$) and c) are the same compounds as used for coating processes, but component b) is preferably replaced by dispersion auxiliaries as component d). These dispersion auxiliaries impart particularly good miscibility of all components of the printing paste and particularly uniform application to the substrate. At the same time, the dispersion auxiliary serves to establish the flow viscosity desired, so that, as in the case of surface coatings, spontaneous alignment of the cholesteric liquid crystals takes place. The use of a dispersant means that it is usually totally unnecessary to use the solvents which are conventional in printing processes, such as cyclohexane, tetrahydrofuran, toluene, xylene, styrene or acrylates.

In addition to the viscosity, the high surface tension of the cholesteric liquid-crystal systems also impairs the printing behavior, easily resulting in structure formation and wetting problems, which are evident from uneven, rough print layers.

Even this inconvenient property can be improved by admixing dispersion auxiliaries, known as hyperdispersants, without adversely affecting the optical properties of the cholesteric liquid-crystal phases. In particular, hyperdispersants of the alkenyl- or alkylsuccinic acid derivative type are highly suitable for this purpose and, in addition to better processing properties, even result in an increase in the colored interference effect.

Particularly suitable dispersion auxiliaries are compounds of the formulae IVa to IVc

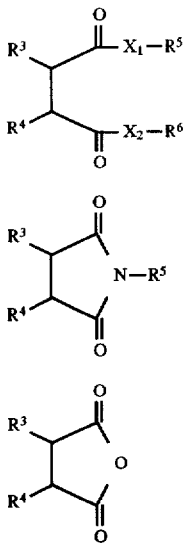

where
- $X_1$ and $X_2$ are oxygen, NH, $NR^5$ or $NR^6$,
- $R^3$ and $R^4$ are hydrogen or an aliphatic radical having a molecular weight of up to 5000, where one of the radicals $R^3$ or $R^4$ is hydrogen,
- $R^5$ and $R^6$ are hydrogen or an aliphatic or aromatic radical having a molecular weight of up to 50,000, where, if $X_1$ and/or $X_2$ is oxygen, $R^5$ and/or $R^6$ can also be a monovalent cation or the equivalent of a divalent cation.

The dispersion auxiliaries IVa to IVc are generally commercially available compounds or mixtures thereof. These compounds are obtained by reacting fumaric or maleic acid derivatives with olefins. Preferred radicals $R^3$ and $R^4$ are derived from the following olefins:

olefins having 8 to 40 carbon atoms and preferably carrying a terminal double bond, oligoolefins or polyolefins which are derived from monoolefins having 2 to 30 carbon atoms and may be substituted, for example, by chlorine and have a mean molecular weight of from 100 to 5000, preferably from 500 to 2000. Particularly preferred radicals $R^3$ and $R^4$ are derived from diisobutene, dibutadiene, polyisobutylene having 3 to 90 isobutylene units, polypropylene having 3 to 120 propylene units, polyethylene having 4 to 180 ethylene units and polybutadiene having 3 to 90 butadiene units, especially a polyisobutylene having 3 to 40 isobutylene units.

The compounds IVa to IVc are generally employed as the mixtures resulting from the preparation. The preparation can also result in the formation of compounds containing more than one succinic acid derivative, for example if polyunsaturated olefins are used. These compounds are likewise effective constituents of the dispersion auxiliary mixtures.

The moieties $X_1R^5$, $X_2R^6$ and $NR^5$ are introduced into the compounds IVa and IVb by reaction of reactive succinic, maleic or fumaric acid derivatives, such as anhydrides or acid chlorides, with the corresponding alcohols or primary or secondary amines.

Suitable amines for this reaction are the following: aliphatic, cycloaliphatic and aromatic, primary and secondary monoamines and polyamines, heterocyclic monoamines and polyamines, alkylene polyamines and polyalkylene polyamines, branched polyalkyleneamines, ether amines, polyether amines, oxyalkylenediamines, polyoxyalkylenediamines, polyoxyalkylene polyamines, hydroxyalkyl- and polyalkylene glycol ether-substituted amines, aminosulfonic acids, aminocarboxylic acids, aminophosphonic acids, aminophosphonic esters and amines containing tertiary or quaternary amino functions.

The amine components are preferably N,N-dimethyl-1,3-diaminopropane, N,N-dimethyldipropylenetetramine, diethylenetetramine, triethylenetetramine or bis(3-aminopropyl)-1,2-diaminoethane.

Suitable alcohols for the reaction are the following: monohydric and polyhydric alcohols, dialcohols, trialcohols, ether alcohols, polyalkylene glycol ethers, alkylene oxide adducts with alcohols and phenols, hydroxyalkyl-substituted heterocyclic compounds, hydroxyalkyl-substituted aromatic compounds, hydroxycarboxylic acids, hydroxysulfonic acids, hydroxyphosphonic acids and polyalcohols or alcohols containing tertiary or quaternary amino functions.

Suitable salts of succinic acid derivatives are in particular the ammonium salts, particularly preferably the quaternary ammonium salts, and the sodium, potassium and calcium salts.

Since polymerizable printing inks are generally cured photochemically, a photoinitiator is preferably added to the cholesteric liquid-crystalline mixture in addition to the compounds described. Suitable photoinitiators are all commercially available products, for example the compounds described for the surface-coating mixtures.

A general procedure for mixing the liquid-crystalline printing paste with the dispersion auxiliary additive and then carrying out the printing comprises first adding the additive and then the photoinitiator to the liquid-crystal material in paste form. The photoinitiator is expediently added in the form of an approximately 20% strength solution of the photoinitiator in an organic solvent, which is expediently stirred with gentle warming of the liquid-crystal material until homogeneous. However, the additive or if desired an additive combination and the photoinitiator can also be stirred in simultaneously. If the photoinitiator is sensitive to UV light, the process should be carried out under yellow light. In offset printing machines with a variable ink application rate, the highest possible, film thickness of the print is set. In the case of oxygen-sensitive liquid-crystal compounds, the system is flushed with an inert gas during and immediately after the printing operation, and, after a hold time of from 0.01 to 10 minutes, depending on the substances, the print is crosslinked by exposure to light. Curing by means of light of the appropriate wavelength can take from a few seconds to several minutes, depending on the intensity of the irradiation. The liquid-crystalline film is then dry and exhibits the desired optical behavior.

The angle-dependent color changes are particularly impressive if the liquid-crystalline film is applied to a black substrate, ie. one which does not absorb selectively. Interesting variants can also be achieved using substrates which absorb selectively or by admixing carbon black or colored pigments with the liquid-crystal material.

The area of application of liquid-crystal prints is, in particular, in the decorative area and in the area of marking of bank notes and similar papers which are to be protected against forgery. It covers prints of all types, it being possible to print substrates such as paper, board, leather, films, cellulose sheeting, textiles, plastics, glass, ceramics and metals. A wide variety of printing methods can be used, for example screen printing, flexographic printing, offset printing, ink jet printing, intaglio printing, letterpress printing, pad printing, heat-seal printing and other transfer printing methods. Application with the aid of a casting slot is also possible, which allows very thin, uniform layers to be obtained. It is also possible to use engraved rollers with chamber coater (modified coating applicator) or conventional coating applicators. The substrates can be black, colored or white dyed or pigmented and have profiles or preprinted patterns of any type. The liquid-crystal coating always gives the printed article a particularly interesting hue which is dependent on the viewing angle, ie. a hue which varies with the viewing angle and whose intensity depends on the optical absorption capacity of the substrate.

An interesting embodiment of the novel process comprises preparing pigments by offset printing. This printing method enables a cholesteric liquid-crystalline printing paste to be applied to a substrate, for example a film or metal sheet, as dots of identical dimensions and then cured. The resultant pigment particles have virtually identical shape and size, which can be set very precisely by varying the printing parameters. If the substrate is suitably pretreated with an adhesion-reducing agent, the pigments can then easily be removed from the substrate and used further in a conventional manner as colored pigments. These pigments can very readily be incorporated into surface-coating systems owing to their narrow size distribution and, in contrast to the pigments described in DE-A 42 40 743, give coating surfaces without roughness and of high surface quality.

The novel mixtures can particularly advantageously be applied to the substrates in the form of aqueous dispersions. In addition to the liquid-crystalline compounds and the chiral compounds, dispersions of this type contain conventional binders and, if desired, further auxiliaries, for example light stabilizers and preservatives, pigments and soluble dyes. The liquid-crystal content of these dispersions, which are suitable as interior and exterior paints, is generally from 20 to 95% by weight.

Of particular importance is the addition of dispersants. These modify the properties of the dispersions so that, after evaporation of the diluent, ie. in general water, spontaneous alignment of the liquid crystals occurs, with the associated color effects.

The dispersion auxiliaries employed are preferably water-soluble, high-molecular-weight organic compounds containing polar groups, such as polyvinylpyrrolidone, copolymers of vinyl propionate or acetate and vinylpyrrolidone, partially hydrolyzed copolymers of an acrylate and acrylonitrile, polyvinyl alcohols having various residual acetate contents, cellulose ethers, gelatines or mixtures of these substances. Particularly preferrred protective colloids are polyvinyl alcohol having a residual acetate content of less than 35, in particular from 5 to 30 mol %, and/or a vinylpyrrolidone-vinyl propionate copolymer having a vinyl ester content of less than 35% by weight, in particular 5 to 30% by weight;

Both nonionic emulsifiers and, in special cases, ionic emulsifiers can be used. Preferred emulsifiers are relatively long-chain alcohols or phenols having various degrees of ethoxylation and/or propoxylation (adducts of from 4 to 50 mol of ethylene oxide and/or propylene oxide). Combinations of the abovementioned protective colloids with such emulsifiers are particularly advantageous, since they give very finely divided dispersions.

Other suitable dispersion auxiliaries are, for example, dihexyl sulfosuccinate, sulfosuccinate monoesters, the sodium salts of dodecylbenzenesulfonic acid and pentadecanesulfonic acid, potassium oleate, sodium lauryl sulfate, alkylpolyglycosides, isooctylphenol, isononylphenol, $C_{12}$–$C_{18}$-fatty alcohols and fatty alcohol alkoxylates.

Other particularly suitable dispersion auxiliaries are those based on polysiloxanes.

The dispersion auxiliaries described are suitable for the preparation of oil-in-water emulsions. However, it is also possible to prepare emulsion coating compositions based on water-in-oil emulsions. For these dispersions, emulsifiers and emulsifier mixtures as described, for example, in EP-A 0 623 630 are particularly suitable. Other suitable dispersion auxiliaries are sorbitan monostearate, sorbitan monopalmitate, sorbitan tristearate, sorbitan monooleate, sorbitan sesquioleate, polyoxyethylene sorbitol ether, polyoxyethylene cetyl ether, polyoxyethylene stearyl ether and polyoxyethylene oleyl ether.

Miniemulsions are also suitable as the basis of the noval coating compositions. Miniemulsions have the advantage of forming particularly stable emulsions and therefore have a particularly long shelf life. In order to prepare the miniemulsions, the emulsions described above, which typically have droplet diameters in the micron region, are, for example, homogenized with the aid of a high-pressure homogenizer, giving emulsions having a droplet diameter of >200 nm, in which no phase separation is observed over a period of weeks.

In order to prepare the liquid-crystal dispersions, the liquid-crystalline mixture comprising components $a_1$) and/or $a_2$) and c) is mixed, if desired, with a small amount of a solvent, such as tetrahydrofuran, dioxane, acetone, methyl ethyl ketone, the propanols, the butanols, ethyl acetate, butyl acetate, methylene chloride, the xylenes or toluene, or alternatively water, in order to reduce the viscosity. This can also be achieved by adding a polymeric binder, such as cellulose acetobutyrate. However, the liquid-crystalline mixture is preferably mixed directly with the dispersion auxiliary, which can be also be added as an aqueous solution. The mixture is homogenized intensively, for example by stirring. Water is subsequently added, and the mixture is again homogenized thoroughly. The amount of water depends on the desired use. Preferably, from 20 to 80% by weight, particularly preferably from 40 to 60% by weight, of water are added, based on the total amount of finished dispersion. For processing, the dispersions can be diluted with water, to which a dispersion auxiliary can again be added, to the desired viscosity and colorant concentration.

For curing the films formed from the dispersion, thermal processes or radiation processes, such as light or electron-beam curing, depending on the type of polymerizable group, are possible, as for the surface-coating mixtures. The addition of polymerization initiators, as described for the surface-coating mixtures, is also advantageous for the curable dispersion films.

The advantage of the dispersion coatings is their good processing properties. The dispersions have low viscosities, can be prepared without solvents and therefore do not require ventilation equipment and can be applied by all known, simple application methods, such as brushing, rolling, spraying, printing, dipping or by using a casting slot. Spontaneous alignment also takes place from the dispersion after the novel coating process, so that the observation angle-dependent color impression desired is achieved.

EXAMPLES

Example 1

Preparation of a liquid-crystal mixture having the structure Ia

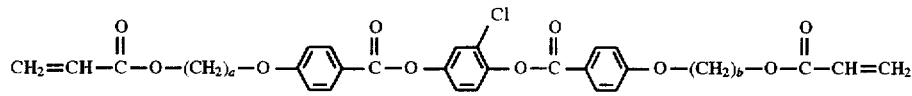

a and b=2, 4 or 6

A mixture of 100 ml of pyridine and 14.4 g (100 mmol) of 2-chlorohydroquinone was mixed gradually at 20° C. with a solution of 18.78 g (67 mmol) of 4-(2-acryloxyethoxy)benzoyl chloride, 19.92 g (67 mmol) of 4-(2-acryloxybutoxy)benzoyl chloride and 20.65 g (67 mmol) of 4-(2-acryloxyhexoxy)benzoyl chloride in 100 ml of toluene. The reaction mixture was then kept at 60° C. for 4 hours with stirring, after which it was introduced into a mixture of ice and hydrochloric acid and subjected to conventional work-up.

The different alkylene spacers in the starting compounds resulted in a statistical mixture of 9 possible isomers (yield 89%), which exhibited better phase behavior than an individual compound.

Phase behavior: N 91°–98° C. I

Example 2

Preparation of a cholesteric liquid-crystal mixture A 9.5 g of the liquid-crystal mixture prepared in Example 1, 0.5 g of 1,4:3,6-dianhydrosorbitol 2,5-bis(4'-(6-acryloxyhexoxy)benzoic acid) ester and 20 ml of dichloromethane were mixed, and the solvent was subsequently removed at 70° C. under reduced pressure.

Example 3

Preparation of a cholesteric liquid-crystal mixture B 9.3 g of the liquid-crystal mixture prepared in Example 1, 0.7 g of 1,4:3,6-dianhydrosorbitol 2,5-bis(4'-(6-acryloxyhexoxy)benzoic acid) ester and 20 ml of dichloromethane were mixed, and the solvent was subsequently removed at 70° C. under reduced pressure.

Example 4

Preparation of a cholesteric liquid-crystal mixture C 10.0 g of the liquid-crystal mixture prepared in Example 1, 0.5 g of 1,4:3,6-dianhydrosorbitol 2,5-bis(4'-(6-acryloxyhexoxy)benzoic acid) ester and 20 ml of dichloromethane were mixed, and the solvent was subsequently removed at 70° C. under reduced pressure.

Example 5

Preparation of a cholesteric liquid-crystal mixture D

The liquid-crystal mixture was prepared by a method similar to that of Example 3, but the chiral component used was 1,4:3,6-dianhydrosorbitol 2,5-bis(4'-(2-acryloxyethoxy) benzoic acid) ester.

Example 6

Preparation of a cholesteric sprayable paint 10.5 g of the cholesteric liquid-crystal mixture C were stirred with 0.15 g of 2,4,6-trimethylbenzoyldiphenylphosphine oxide, 1 g of toluene and 4 g of ethyl acetate until a homogeneous solution was obtained. This cholesteric mixture was transferred into a high-pressure spray gun (Proxxon, Gala 500) and sprayed onto black-painted metal, glass and paper surfaces at a pressure of 3 bar. The fine droplets were irradiated using a mercury discharge lamp (80 W/cm$^2$) for 5 seconds until the surface was tack-free. The spraying operation was repeated until a uniform surface evenly covered by the cholesteric liquid crystal was obtained. The diameter of the platelet-like bodies formed on the treated surface by spraying was from 20 to 50 µm.

Example 7

The procedure was similar to that in Example 6, but 0.15 g of a thermochemical initiator was employed. The paint was sprayed onto a black-painted metal surface and subsequently crosslinked by thermal treatment (120 min at 65° C.).

Example 8

Preparation of a cholesteric writing ink 5 g of the cholesteric liquid-crystal mixture D were stirred under yellow light with 0.075 g of 2,4,6-trimethylbenzoyldiphenylphosphine oxide, 0.25 g of toluene and 1.5 g of graphite pigment until the pigment and initiator were uniformly distributed. The mixture prepared in this way was suitable for introduction into a pressure cartridge and writing on black paper using a fountain pen. After photopolymerization, an inscription which varied in color from bronze-red to green was obtained. This mixture was also suitable for use as a spreading ink for covering relatively large surfaces with a brush or similar applicator. The mixture was also suitable for application by screen printing.

Example 9

Cholesteric liquid-crystalline paint 1.4 g of toluene, 0.5 g of polyvinyl alcohol and 1 ml of ethanol were added to 2 g of of cholesteric liquid-crystalline mixture A, and the mixture was dispersed, giving a cloudy, low-viscosity mixture. This was applied as in Example 6 to the black-painted substrate using a spray gun. After evaporation of the solvent, the liquid-crystalline layer formed, which reflected in the red, was cured by irradiation with light. The cured film was stable to the effects of solvents, temperature and light.

Example 10

Black-pigmented cholesteric liquid-crystalline paint 0.3 g of black pigment was added to the mixture mentioned in Example 9 and homogenized. This mixture was applied by spraying as in Example 6 to an uncoated metallic substrate. After evaporation, a film with good hiding power which reflected in the red was obtained and was cured by irradiation with light. The cured film was stable to the effects of solvents, temperature and light.

Example 11

0.3 g of black pigment and 0.04 g of a UV stabilizer were added to the mixture indicated in Example 9 and homogenized. This mixture was applied to an uncoated substrate by spraying. After evaporation, a film with good hiding power which reflected in the red was obtained and was cured by irradiation with light. The cured film was stable to the effects of solvents, temperature and light.

Example 12

Cholesteric liquid-crystalline paint 0.4 g of a 20% strength solution of CAB (cellulose acetobutyrate) in butyl acetate and 7 g of butyl acetate were added to 10 g of the cholesteric liquid-crystalline mixture B, and the solution was homogenized, giving a slightly viscous, transparent solution. This mixture was applied to a black-primed surface by repeated spraying, allowing each coat to dry. After evaporation of the final coat, the mixture was polymerized photochemically. To this end, the coated surface was exposed to a UV lamp (OSRAM Nitraphot, distance 30 cm, nitrogen atmosphere) for 30 seconds, giving a uniform, strongly adherent film with good flow-out in a thickness of 16 µm which had a viewing angle-dependent color impression with a color change from green to blue.

Example 13

Cholesteric liquid-crystalline paint 0.04 g of a 20% strength solution of CAB (cellulose acetobutyrate), dissolved in butyl acetate, and 1.4 g of butyl acetate were added to the cholesteric liquid-crystalline mixture A, and the solution was homogenized, giving a slightly viscous, transparent solution. This mixture was applied to a black-primed surface by repeated spraying, allowing each coat to dry. After evaporation of the final coat, the mixture was polymerized photochemically, giving a uniform, strongly adherent film with good flow-out in a thickness of 15 µm which had a viewing angle-dependent color impression with a color change from red to green.

Example 14

A cholesteric liquid-crystalline paint was prepared as described in Example 13. After curing, a commercially available clearcoat was applied on top and then cured. The coating produced in this way had increased gloss and improved resistance to light and moisture than a coating without clearcoat.

A coating system of this type, comprising electrodeposition coating, filler, cholesteric paint and clearcoat was subjected to an accelerated weathering test (WOM). No hue differences or delamination between the coats occurred.

Example 15

0.3 g of a black pigment was added to 2 g of the paint from Example 12, which was suitable for application by spraying, brushing or dipping, and the resultant dispersion was homogenized, giving a black, low-viscosity dispersion. This was applied to a white-primed surface by repeated spraying, allowing each coat to dry. After evaporation of the final coat, the mixture was polymerized photochemically using a mercury discharge lamp (80 W/cm), giving a uniform, strongly adherent film with good flow-out and high hiding power which had a viewing angle-dependent color impression (green/blue).

Example 16

The auxiliary BYK 055 (manufacturer: Byk, Wesel) in an amount of 0.01 g of the supply form was added to 2 g of the paint from Example 13, giving a slightly viscous, transparent solution. This mixture was applied to a black-primed surface by repeated spraying, allowing each coat to dry. After evaporation of the final coat, the mixture was polymerized photochemically, giving a uniform, strongly adherent film with good flow-out and high surface hardness which had a viewing angle-dependent color impression with a color change from red to green. The film thickness was 14 µm.

Example 17

The auxiliary BYK 057 (manufacturer: Byk, Wesel) in an amount of 0.01 g of the supply form was added to 2 g of the paint from Example 13, giving a slightly viscous, transparent solution. This mixture was applied to a black-primed surface by repeated spraying, allowing each coat to dry. After evaporation of the final coat, the mixture was polymerized photochemically, giving a uniform, strongly adherent film with good flow-out and high surface hardness which had a viewing angle-dependent color impression with a color change from red to green. The film thickness was 14 µm.

Example 18

Comparative experiment: printing paste containing no dispersion auxiliary

The paste-form cholesteric liquid-crystal mixture A was warmed to 40° C. under nitrogen in a water bath. 1.5% by weight (based on the liquid-crystal material) of 2,4,6-trimethylbenzoyldiphenylphosphine oxide were added with stirring, and stirring was continued for 10 minutes until the mixture was homogeneous. After cooling to 25° C., the paste was printed onto a white board print base with black fields on a FOGRA offset printing machine with variable ink application rate at an ink application rate of 1.5 g/m². The process was carried out under yellow light.

After a hold time of 5 minutes under nitrogen, the print film was cured by exposure to light from a UV lamp (200 to 230 V/300 W 4FZ) for 3 minutes.

A coating which varied slightly in color between green and copper and was visible on a black background, had a granular structure and was also mechanically rough was obtained. The optical photomicrograph showed that the coating was not coherent, but rather comprised a large number of small liquid-crystal islands on an unwetted black background.

Example 19

The liquid-crystal paste was warmed to 40° C. under nitrogen in a water bath as in Example 18. With stirring, 0.5% by weight of the PIBSA (polyisobutylenesuccinic anhydride) additive (based on the weight of the liquid-crystal material) was introduced over the course of 2 minutes, 1.5% by weight (based on the weight of the liquid-crystal material) of 2,4,6- trimethylbenzoyldiphenylphosphine oxide were then added, and the mixture was stirred for 10 minutes. The paste was printed under yellow light onto a white board print base with black fields on a FOGRA offset printing machine with variable ink application rate at an ink application rate of 1.5 g/m$^2$. Rubbing duration: 40 sec.

After a hold time of 3 minutes under nitrogen, the print film was cured by exposure to light from a UV lamp as in Experiment 1.

A film which was clearly visible on a black background and varied in color between green and copper and which appeared significantly stronger in color and more homogeneous than that produced in Example 18 was obtained. The optical photomicrograph showed that the coating was significantly more coherent than in Example 18 and that fewer areas of the substrate were unwetted or uncoated than in Example 18. The mechanical roughness of the film dropped.

Example 20

The procedure was similar to that in Example 19, the only difference being that 5% by weight of PIBSA additive, based on the weight of the liquid crystal, were added to the liquid-crystal material.

A film was obtained whose optical properties and homogeneity were further improved. The film appeared stronger in color than in Example 19 and was more homogeneous.

Example 21

The procedure was similar to that in Example 19, with the difference that 10% by weight of PIBSA additive, based on the weight of the liquid crystal, were added to the liquid-crystal material.

A film was obtained whose homogeneity was further improved. As far as the optical properties of the film were concerned, these were of slightly lower quality than in Example 20. The film appeared somewhat darker and the hue change from green to copper as impaired.

Example 22

The procedure was similar to that in Example 20, with the difference that, instead of the full-area print (Examples 18 to 21), discrete dots were printed using an engraved print roll (56 dots per centimeter).

Both on paper and on transparent plastic film, it was possible to print a grid of graduated intensity.

Mikroscopic investigations showed that the grid points had a thickness of 1.5 µm and a diameter of 5 µm. The prints exhibited a color change comparable to that for full-area printing.

Example 23

The procedure was similar to that in Example 19, with the difference that 5% by weight of PIBSA additive, 1% by weight of carbon black and 1.5% by weight of 2,4,6-trimethylbenzoyldiphenylphosphine oxide were added simultaneously to the liquid-crystal material. After stirring for 10 minutes, the paste was printed on a FOGRA machine under yellow light.

A film which was extremely bright on a black background, varied in color between green and copper, was homogeneous and had even better optical quality than the print from Example 20 was obtained.

Example 24

5% by weight of the PIBSA additive were stirred into the liquid-crystal paste at room temperature (25° C.) under nitrogen. After the additive had been stirred in for 5 minutes, 1.5% by weight of 2,4,6-trimethylbenzoyldiphenylphosphine oxide were added, and the mixture was stirred for a further 10 minutes. The paste was then printed onto a white board provided with a black pattern on a screen-printing machine with automatic coater (screen mesh width: 70 openings per square inch).

Curing of the film under a UV lamp (200 to 230 V/300 W 4FZ) for 5 minutes gave a decorative color coating with an observation angle-dependent hue which varied clearly in color, in particular over black, between copper and green.

Example 25

Aqueous emulsion paint with a viewing angle-dependent color impression 4.5 g of cholesteric liquid-crystal mixture A, 0.2 g of 2,4,6-trimethylbenzoyldiphenylphosphine oxide, 0.08 g of cellulose acetobutyrate and 1.5 g of 33% strength by weight aqueous polyvinylpyrrolidone solution were homogenized for 30 minutes with vigorous stirring. 4 g of water were subsequently added to this dispersion, and the mixture was homogenized for a further 20 minutes by further stirring, giving an aqueous dispersion of a cholesteric liquid crystal in water.

Example 26

The dispersion obtained in Example 25 was applied by brushing to a black-painted metal sheet. Drying gave a paint film which appeared blue when viewed perpendicularly, but appeared violet when the viewing direction moved from the perpendicular. The film obtained in this way was then cured by exposure to UV light. The color impression was retained.

Example 27

The dispersion obtained in Example 25 was applied by spraying to a black-painted metal sheet. Drying gave a paint film which appeared blue when viewed perpendicularly, but appeared violet when the viewing direction moved from the perpendicular. The film obtained in this way was then cured by exposure to UV light. The color impression was retained.

Example 28

Low-solvent, water-thinnable emulsion paint 3 g of cholesteric liquid-crystal mixture B, 0.2 g of 2,4,6-trimethylbenzoyldiphenylphosphine oxide and 0.08 g of cellulose acetobutyrate were dissolved in 1.5 g of butyl acetate. 1.5 g of 33% strength by weight aqueous polyvinylpyrrolidone solution were added to this solution, and the mixture was then homogenized for 30 minutes with vigorous stirring. 4 g of water were subsequently added to this dispersion, and the mixture was homogenized briefly.

A low-solvent, aqueous dispersion which scattered light to a considerable extent was obtained.

Example 29

The dispersion obtained in Example 28 was applied by brushing to a black-painted metal sheet. Drying gave a paint film which appeared green when viewed perpendicularly, but appeared blue when the viewing direction moved from the perpendicular. The film obtained in this way was then cured by exposure to UV light. The color impression was retained.

Example 30

The dispersion obtained in Example 28 was applied by spraying to a black-painted metal sheet. Drying gave a paint film which appeared green when viewed perpendicularly, but appeared blue when the viewing direction moved from the perpendicular. The film obtained in this way was then cured by exposure to UV light. The color impression was retained.

Example 31

The dispersion obtained in Example 28 was applied by brushing to a wood substrate. Drying gave a paint film which appeared green when viewed perpendicularly, but appeared blue when the viewing direction moved from the perpendicular. The film obtained in this way was then cured by exposure to UV light. The color impression was retained.

Example 32

Dispersion coating composition based on water-in-oil emulsions 2 g of cholesteric liquid-crystal mixture A, 0.1 g of 2,4,5-trimethylbenzoyldiphenylphosphine oxide and 0.04 g of cellulose acetobutyral and 0.1 g of polyoxyethylene stearyl ether were homogenized by vigorous stirring. 1 ml of water was then added, and the mixture was stirred for a further 2 hours. Addition of a further ml of water with stirring gave a stable, flowable paste, and addition of a further ml of water gave a low-viscosity emulsion.

Example 33

A mixture was prepared analogously to Example 32 using 0.2 g of polyoxyethylene stearyl ether, with successive addition of 1 ml of water in each case. Stirring gave emulsions having a similar character to that described in Example 32, but with somewhat higher viscosity.

We claim:

1. A coating composition suitable for coating a substrate comprising a polymerizable mass containing a liquid-crystalline monomer having two polymerizable reactive groups, said mass including
   (i) a mixture of
      $a_1$) a chiral liquid-crystalline monomer having two polymerizable reactive groups, and
      b) a polymeric binder, or a monomeric compound capable of being polymerized to form a polymer binder,
   or
   (ii) a mixture of
      $a_2$) an achiral, liquid-crystalline monomer, having two polymerizable reactive groups,
      b) a polymeric binder, or a monomeric compound capable of being polymerized to form a polymeric binder and
      c) a non-liquid-crystalline chiral compound.

2. A coating composition as set forth in claim 1, wherein said reactive groups are groups capable of being converted to cross-linked polymers by free-radical, ionic or photochemical polymerization process such that upon initiation and carrying out of polymerization, the resulted binders are cross-linked.

3. A coating composition as set forth in claim 1, wherein said reactive groups are capable of being polymerized by photochemical initiation.

4. A coating composition as set forth in claim 3, wherein said reactive groups are vinyl or isopropenyl groups.

5. A coating composition as set forth in claim 3, wherein said reactive groups are 4-vinylphenyl groups.

6. A coating composition as set forth in claim 3 in which said reactive groups are chloroethenyl groups.

7. A coating composition as set forth in claim 1 in which said reactive groups are selected from the group consisting of epoxide, cyanate or isocyanate.

8. A coating composition suitable for application by a printing press comprising:
   (i) a mixture of
      $a_1$) a chiral liquid-crystalline monomer having two polymerizable reactive groups, and
      d) a dispersion auxiliary
   or
   (ii) a mixture of
      $a_2$) an achiral, liquid-crystalline monomer, having two polymerizable reactive groups, and
      d) a dispersion auxiliary.

9. A coating composition as set forth in claim 1 comprising
   5–99.8 wt. % of component $a_1$), and
   0.2–20 wt. % of component b).
   with reference to the total amount of the reaction coating mixture in each instance.

10. A coating composition as set forth in claim 1 comprising
    5–99.6 wt. % of component $a_2$),
    0.2–20 wt. % of component b), and
    0.2–20 wt. % of component c),
    with reference to the total amount of the reaction coating mixture in each instance.

11. A composition according to claim 1 which also contains a solvent or diluent agent.

12. A process for coating a substrate comprising applying to the substrate a polymerizable mass as set forth in claim 1 and causing said polymerizable mass to polymerize.

13. A process as set forth in claim 12, wherein polymerization is made to take place at a temperature in the range of from 10° to 1 80° C.

14. A process as set forth in claim 13, wherein polymerization is initiated by irradiating said film with light.

15. A process of preparing liquid crystalline pigments comprising coating a liquid crystalline printing paste as set forth in claim 8, on a substrate pretreated with an adhesion-reducing agent, using an offset printing process, to form a coating comprising dots of substantially identical dimensions, curing said dots and removing said dots from the substrate thereby forming pigments capable of being readily incorporated into a surface-coating systems.

\* \* \* \* \*